US009019602B2

(12) United States Patent
Zhang et al.

(10) Patent No.: US 9,019,602 B2
(45) Date of Patent: Apr. 28, 2015

(54) SCATTERING SCREEN SYSTEM, METHOD OF MANUFACTURE AND APPLICATION THEREOF

(71) Applicant: City University of Hong Kong, Hong Kong (HK)

(72) Inventors: Wenjun Zhang, Hong Kong (HK); Zhenzhen Lu, KaiFeng (CN); Hao Wang, Beijing (CN); Chun-Sing Lee, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 38 days.

(21) Appl. No.: 13/905,644

(22) Filed: May 30, 2013

(65) Prior Publication Data
US 2014/0355111 A1 Dec. 4, 2014

(51) Int. Cl.
*G03B 21/62* (2014.01)
*G02B 5/02* (2006.01)
*G03B 21/60* (2014.01)

(52) U.S. Cl.
CPC ............... *G03B 21/62* (2013.01); *G03B 21/60* (2013.01); *G02B 5/0278* (2013.01); *G02B 5/0268* (2013.01)

(58) Field of Classification Search
CPC .......... G03B 21/60; G03B 21/62; G03B 5/02; G03B 5/0268; G03B 5/0278

USPC ........................................................ 359/460
See application file for complete search history.

(56) References Cited

U.S. PATENT DOCUMENTS

| 8,223,425 B2* | 7/2012 | Hashimura et al. .......... 359/296 |
| 2010/0208217 A1 | 8/2010 | Hiji et al. |
| 2010/0289003 A1* | 11/2010 | Kahen et al. ..................... 257/14 |
| 2011/0143137 A1* | 6/2011 | Alivisatos et al. ............ 428/373 |
| 2011/0164317 A1* | 7/2011 | Vergohl et al. ................ 359/460 |
| 2013/0240348 A1* | 9/2013 | Mi et al. ..................... 204/157.5 |
| 2013/0293123 A1* | 11/2013 | Deak et al. ..................... 315/186 |

OTHER PUBLICATIONS

Nujis et al. "Diffraction and scattering at antiglare structures for display devices." Applied Optics, vol. 33, No. 18, pp. 4058-4068 (1994).
Song et al. "Controllable Fabrication of Three-Dimensional Radial ZnO Nanowire/Silicon Microrod Hybrid Architectures". Crystal Growth and Design, vol. 11, pp. 147-153 (2011).
Lin et al. "A dual-directional light-control film with a high-sag and high asymmetrical-shape microlens array fabricated by a UV imprinting process". J. of Micromechanics and Microengineering, vol. 18, pp. 1-10 (2008).
(Continued)

*Primary Examiner* — Christopher Mahoney
(74) *Attorney, Agent, or Firm* — Heslin Rothenberg Farley & Mesiti, P.C.; Melvin S. Li

(57) ABSTRACT

There is provided a screen scattering system. The system has a transparent substrate forming a substrate layer, and wide band gap materials made of 0D, 1D and 3D elements forming a scattering layer. The 0D, 1D and 3D elements are in the form of nanostructures aligned uniformly on said substrate layer.

15 Claims, 4 Drawing Sheets

(56) References Cited

OTHER PUBLICATIONS

Lu et al. "CdS/CdSe Double-Sensitized ZnO Nanocable Arrays Synthesized Chemical Solution Method and Their Photovoltaic Applications". J. of Physical Chemistry, vol. 116, pp. 2656-2661 (2012).

Matsuda et al. "IDEC Modularizes Large Display Unit for Volume Production". Tech On, http://techon.nikkeibp.co.jp/english/NEWS_EN/20090306/166841/[2009-6-14 [22:27:18] (2009).

* cited by examiner

SCATTERING SCREEN SYSTEM, METHOD OF MANUFACTURE AND APPLICATION THEREOF

FIELD OF THE INVENTION

The present invention is concerned with a scattering screen system, method of manufacture and application thereof.

BACKGROUND OF THE INVENTION

There are currently two main types of scattering screen systems, namely the optical type and the scattering (diffuser) type. These systems are for example described in Nuijs et al 1994, Lin et al 2008, and Matsuda et al 2009, contents of which are incorporated herein in their entirety.

The optical type is generally based on the construction of double lenticular elements. However, in such construction the pitches of the lenticular elements have to be fabricated precisely in order to avoid formation of moiré pattern between the lenticular elements and pixel of the projector.

By comparison, the scattering type is composed of typically highly-transparent diffusers formed on a substrate surface by for example sandblasting, etching or by introducing surface additives. This type of scattering screens may suffer the problem of "sun effect". By sun effect, it means incident light would directly pass through the projection screen without scattering.

In recent years, there have been proposals which suggest the use of a "Fiber Beam" system. Such system makes use of a rear projection display that utilizes resin optical fibers as transmission media. Published US Patent No. 2010/0208217A1, contents of which are incorporated herein in its entirety, for example discloses such system. Utilizing Tsuya Fabric's weaving technology, there is produced high-density webbing with limited damages to the Optical Plastic Fibers (OPFs). However, the cost of obtaining compact weaving fibers is very costly and in many cases may not be economical realistic.

The present invention seeks to provide a scattering screen system with higher efficiency, and/or to widen the viewing angle of monitors/displays or the lighting angles of illumination devices, or at least provide an alternative the public.

SUMMARY OF THE INVENTION

According to a first aspect of the present invention, there is provided a screen scattering system, comprising a transparent substrate forming a substrate layer, wide band gap materials made of 0D, 1D and 3D elements forming a scattering layer, wherein the 0D, 1D and 3D elements are in the form of nanostructures aligned uniformly on the substrate layer. Such system is able to provide a scattering system with higher efficiency and/or to widen the viewing angle of monitors, displays or illumination devices. The system is technically advantageous because, among other reasons, with uniform alignment higher resolution of the image can be obtained. The nano-sized elements also contribute to an increase in scattering ratio than elements in micrometer. Compared to other types of scattering, a screen scattering system according to the present invention is more cost effective in its manufacturing and is able to generate higher scattering capability without decrease in transmittance.

Preferably, the wide band gap materials may be arranged in the form of nano-structure array.

The substrate layer may be configured for deposition of the wide band gap materials, and the wide band gap materials may be inorganic materials selected from a group including glass, quartz, and sapphire.

The substrate layer may be configured for deposition of the wide band gap materials, and the wide band gap materials may be flexible organic materials selected from a group including Perspex, Pyrex and polymethylmethacrylate.

In an embodiment, the wide band gap materials may be selected from a group including ZnO, $TiO_2$, $SnO_2$ and GaN, and wherein the value of band gap of the materials may be at least 3.0 eV.

In another embodiment, the nano-structure array may include 0D high density elements, 1D elements, and 3D hierarchical elements. In a specific embodiment, the 0D elements may include 1D nanosphere, the 1D elements may include nanowires, nanoribbons and nanorods, and the 3D hierarchical elements may include nanotrees and nanostructure arrays.

According to a second aspect of the present invention there is provided a rear projection screen system, comprising a scattering screen system as described above.

According to a third aspect of the present invention, there is provided an illumination device, comprising a scattering screen system as described above.

According to a fourth aspect of the present invention, there is provided an illumination device, wherein the device is a LED lamp. This is significant technologically and economically because in 2012 alone the world market for LED illumination is reported amount to ~US$117.8 billion. In China alone, the LED illumination market is estimated to be about US$23.9 billion by 2012, and is expected to grow at a CAGR (compound annual growth rate) of 43% from 2007 to 2012.

According to a fifth aspect of the present invention, there is provide a method of making a screen scattering system as described above.

Preferably, the method may comprise the use of methodology selected from the group consisting of chemical bath deposition (CBD), hydrothermal, chemical vapor deposition (CVD) via VLS and VS mechanisms with or without the assistance of metal catalyst, magnetron sputtering, and metal organic chemical vapor deposition (MOCVD).

In an embodiment, the method may comprise a step of forming a seeding layer made of the same or different material from that of scattering element. In a specific embodiment, there may be provided a step of forming a seeding layer by deposition prior to synthesis of the scattering layer. In a further specific embodiment, the seeding layer may be deposited by means of chemical bath deposition (CBD), hydrothermal, chemical vapor deposition (CVD), magnetron sputtering, or laser ablation.

BRIEF DESCRIPTION OF THE DRAWINGS

Some embodiments of the present invention will now be explained, with reference to the accompanied drawings, in which:—

DETAILED DESCRIPTION OF PREFERRED EMBODIMENTS OF THE INVENTION

One embodiment of the present invention is concerned with a scattering system constructed based on nanostructures of wide band gap materials. In this embodiment, the value of the wide band gap of the materials is at least 3.0 eV. While different materials may be used suitable materials are found to be ZnO, $TiO_2$ and $SnO_2$. The nanostructures are composed of high-density 0-dimensional (e.g. nano- and microspheres), 1-dimensional (1D) (e.g. nanowires, nanoribbons, nanorods etc.), and 3-dimensional (3D) hierarchical (e.g. nanotrees) arranged on nanostructure arrays and aligned generally uniformly on a transparent substrate, as shown schematically in FIG. 1.

Figure 1:
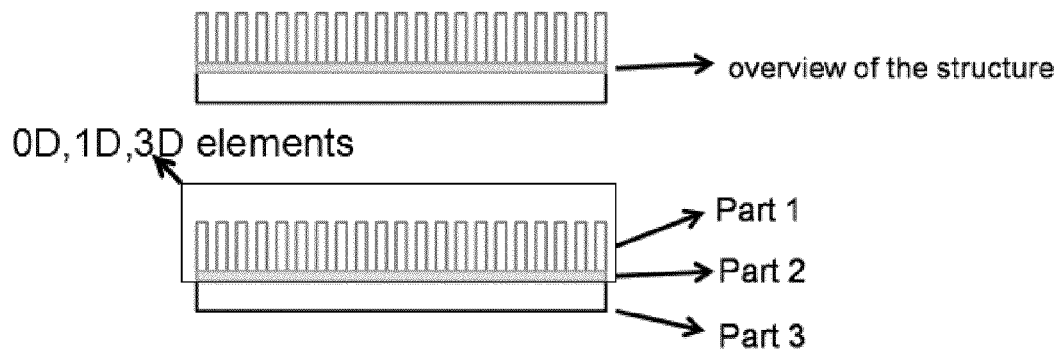
FIG. 1 is a schematic diagram illustrating a nanostructured scattering screen.

FIG. 1 exemplarily illustrates a ZnO nanorod array. A layer indicated as part 1 is a ZnO nanorod array. Alternatively, this array may be replaced with wide band gap (>3.1 eV) nanostructures such as $TiO_2$, $SnO_2$, etc. with different morphologies (0-dimensional (0D), 1-dimensional (1D), and 3-dimensional (3D) hierarchical structures). Although the wide band gap value of at least 3.1 eV is ideal, for practical purpose a system will still work satisfactorily as long as the wide band gap value is at least 3.0 eV. A layer indicated as part 2 is a seeding layer for allowing growing of ZnO nanorods arrays. A layer indicated a part 3 is a substrate. This substrate layer may be prepared using different transparent rigid materials, such as glass, glass ceramics, quartz, and sapphire, etc. and flexible organic materials such as Perspex, Pyrex and polymethylmethacrylate, etc.

The nanostructures can be synthesized by a variety of methods, e.g. solution method, and chemical vapor deposition via the vapor-liquid-solid (VLS) or vapor-solid (VS) mechanisms. While the scattering system is UV opaque (UV-resistance), it has high transmission (transmittance >80%) in the visible light range (400-800 nm). Further, the scattering system has a strong light trapping capability, which enables a very high brightness of the projected images on its surface.

The substrates for depositing the nanostructures are made of transparent materials including inorganic materials such as glass, quartz and sapphire, etc. and flexible organic materials such as Perspex, Pyrex and polymethylmethacrylate. One application is that the scattering system can be used directly as a large-area rear projection screen. The system is able to provide wider viewing angle of various screens and displays such as LCD and LED monitors. It can also be used in the LED lamps to generate uniform illumination.

Figure 2:
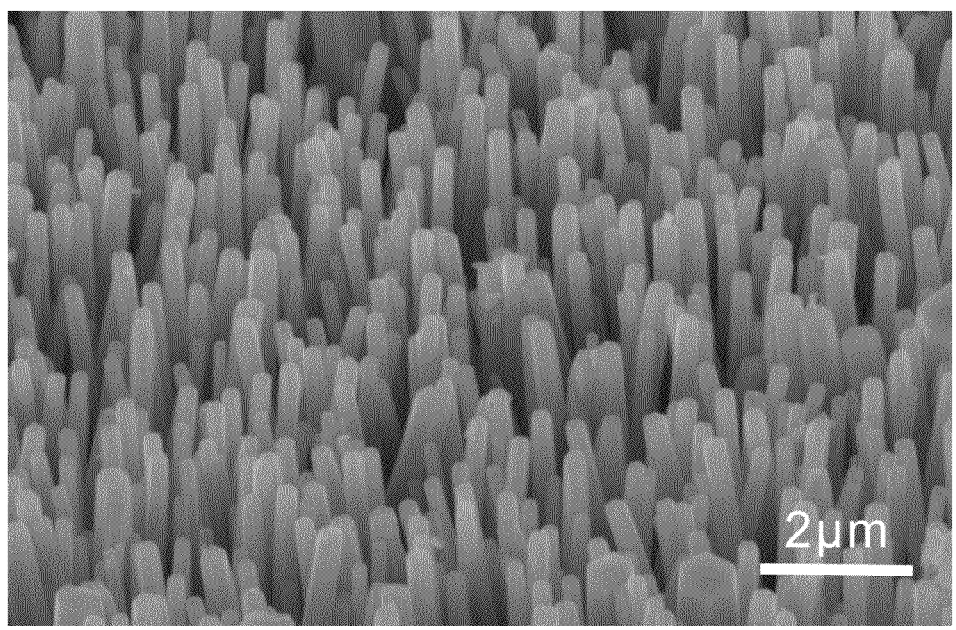
FIG. 2 is a photographic image showing an array of elements at nano-level.

In order to demonstrate the feasibility of a scattering screen system according to the present invnetion with higher efficiecny, by way of example ZnO nanorod arrays were symthesized on glass substrates as an example. FIG. 1 is a schematic structural diagram depicting the overall configuration of the system. Scanning electron microscopy (SEM) photograph of the ZnO nanorod array is shown in FIG. 2. It can be seen that ZnO nanorods are generally aligned uniformlly with a high density ($5 \times 10^8/cm^2$) over the entire substrate surface. The ZnO nanorods are about 150 nm in diameter and 10 µm in length (the length is adjustable upon the reaction time). X-ray diffraction study has verified that the ZnO nanorods can be grown along the [001] direction. However, the nanorods are not strictly perpendicular to the substrate surface. Although ZnO is used in this embodiment, $TiO_2$ and $SnO_2$ equally work since they have similar wide band gap behaviour.

Figure 3:
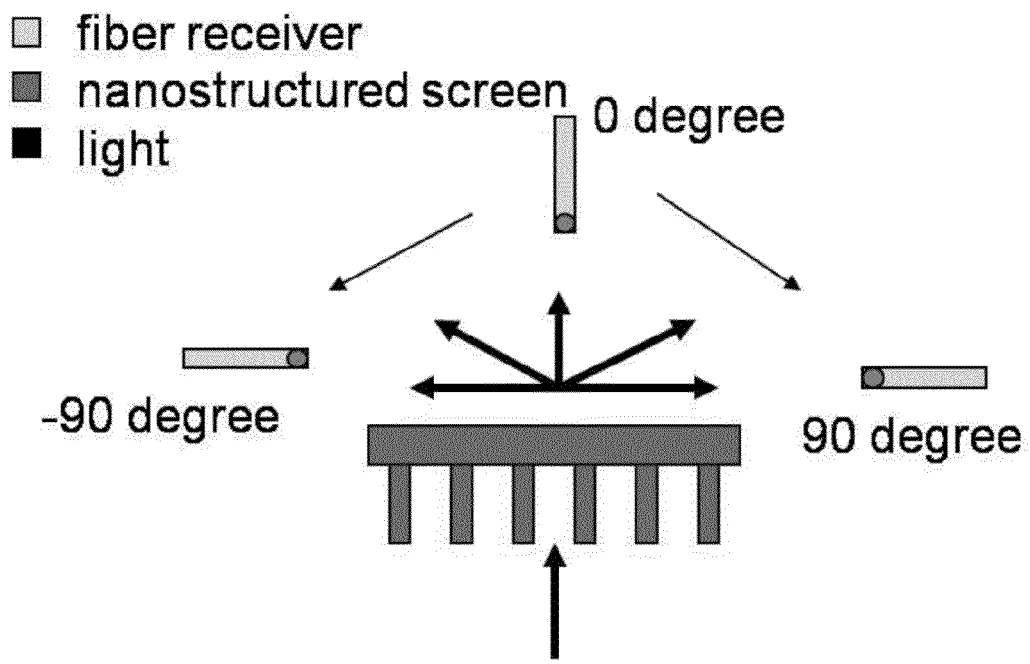
FIG. 3 is a graph demonstrating the relationship between intensity of transmitted light and viewing angle.
Figure 3:
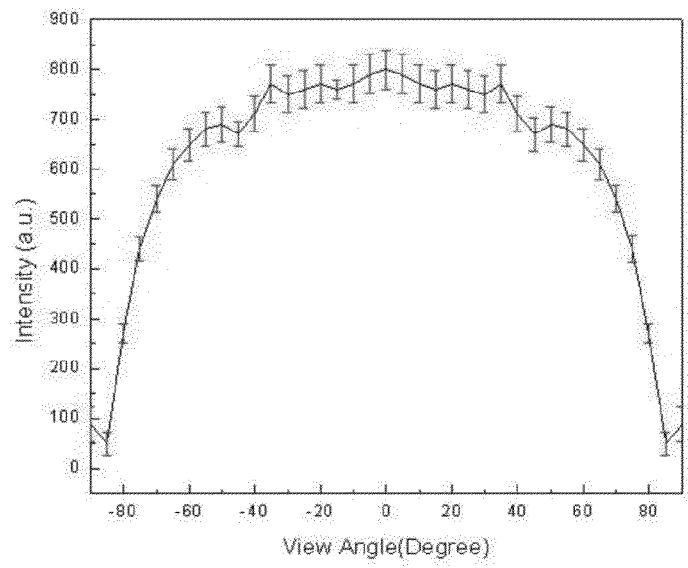

FIG. 3 illustrates a setup for measuring the dependence of scattering light intensity on view angle (above), and the relationship between the intensity of transmitted light and viewing angle ranging from −90 to 90° (below). This figure shows the dependence of the intensity of scattered light on the viewing angles ranging from −90 to 90°. A laser beam of 633 nm was used as the incident light, and the laser spot size is about 2 mm in diameter. Experiment was conducted in that the laser illumination source was behind the sample and was fixed. The fiber receiver was at fixed at a distance of 5 cm from the facula with different angles as shown in FIG. 3. It can be observed that the light intensity decays slowly with increasing the viewing angle of the fiber receiver, indicating a stronge light scattering capability of the reported structure. This is technically advantegeous.

Figure 4:
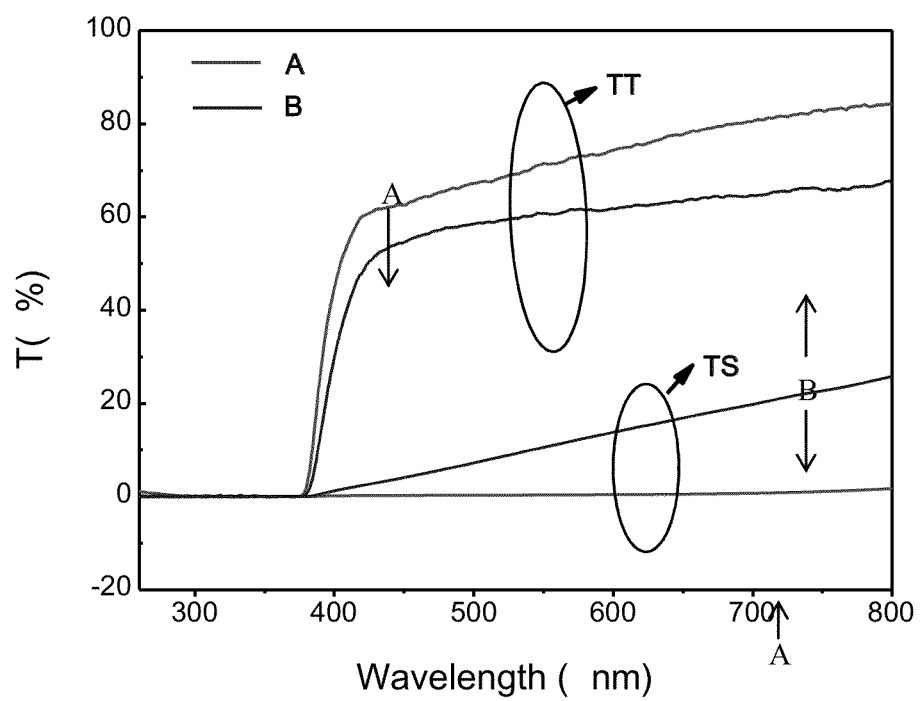
FIG. 4 is a graph showing total transmittance (TT) and specular transmittance (TS) spectra of samples.

FIG. 4 is a graph showing results from an experiment. The experiment illustrates total transmittance (TT) and specular transmittance (TS) spectra of samples A: ZnO nanorod arrays grown on glass substrate with a seeding layer (as depicted FIG. 2 and B: optical scattering element made of polymethylmethacrylate (the scattering element size is about 50 µm) which is commercially used in state-of-art back-projection screens. Experiment was conducted to show that the total and specular transmittance (TT and TS, respectively) when UV-V spectrophotometer (Shimadzu UV-3101 PC) with and without an integrating sphere, respectively. The diffused transmittance (TD), which is the light passing through the screen by scattering, is defined as TD=TT−TS. The haze factor, which quantifies the light-scattering capacity of the samples, is defined as the TD/TT ratio. Both TT and TS spectra of ZnO nanorod/glass (sample A) are shown in FIG. 4. As a reference, the corresponding spectra of the structured PMMA (sample B) which is commercially used in the state-of-art back-projection screens are also depicted. It is revealed that Sample A exhibits TT in the range from 60% to 80%, and very low TS of about 0.3% in the wavelength from 400 to 800 nm. Thus a haze factor of about 100% for the wavelengths from 400 to 800 nm is resulted. In contrast, sample B reveals TT from 60% to 70% in the same wavelength range. However, sample B has a higher TS as compared to sample A. As a result, its haze factor dramatically decreases from 96% at 400 nm to 65% at 800 nm. The above results imply that the ZnO nanorod/glass screen has better total transmittance and significantly improved scattering capability in the visible light range.

In one embodiment, the wide band gap structures can be made by the synthesis of ZnO nanorods arrays. There are different ways via which the ZnO nanorods may be made. They are explained as follows.

a) Chemical Bath Deposition (CBD):

Prior to the synthesis of ZnO nanorods, substrates made of glass are cleaned with acetone, ethylene glycol, and ethanol by ultrasonication sequentially. The substrates are then wetted with a small quantity (e.g. a drop) of zinc acetate ethanol solution (5.0 mM) and dried under a flow of nitrogen. This step is repeated for three to five times in order to provide layer of sufficient zinc acetate uniformly covering the substrates. The substrates are then heated at 350° C. in air for about 20 mins. to form a layer of ZnO seeds. The seeded substrates are held by a holder (e.g. rubber holder) and placed vertically into a Teflon-lined stainless steel autoclave filled with zinc nitrate hydrate (25.0 mM), hexamethylenetetramine (25.0 mM), and polyethylenimine (5.0 mM) aqueous solution, and kept at 90° C. for 6-12 hours. Finally, the samples are taken out from the solution, washed with deionized water and ethanol, and then dried in air. FIG. 2 is a photographic image showing the SEM morphology of samples procuded according these procedures.

b) Chemical Vapour Deposition (CVD):

To grow ZnO nanorod arrays by CVD, quartz/sapphire substrates are first coated with a thin layer of PR (AZ5206E) by spin coating at a speed of 8000 rpm for 60 s and then treated by hard-baking at 100° C. for 10 min. At this stage the RR layer is converted to amorphous carbon, which serves as catalyst for the CVD growth of ZnO nanorods. The synthesis of ZnO nanorod arrays is carried out in a traditional three-temperature zone CVD system. For example, an alumina boat containing 3 g of ZnO powder is placed in the center of a tube furnace. The substrate is placed downstream for the nucleation and growth of ZnO NWs. Argon is used as carrier gas at a flow rate of 50 sccm with additional 0.5 sccm oxygen flow to facilitate the reaction. The furnace is heated to 1100-1300° C. and kept for half an hour under vacuum conditions ($10^{-2}$ Torr). ZnO NWs are found to grow on the substrates when the temperature was about 600-800° C.

It is to be noted that a scattering screen system as described above is technically advantageously in that it can be used directly as a large-area rear projection screen, and to be applied to widen the viewing angle of various screens and displays such as LCD monitors and LED displays. It can also be used in the LED lamps to generate uniform illumination. The scattering system is UV opaque (UV-resistance), it can thus be used as a UV block layer in the said devices as well. Functionally, a scattering system according to the present invention possesses one or more of the following technical advantages.

1. High-efficiency scattering from −90 to 90°.
2. Reduced reflection and low absorption in the visible light range.
3. Strong light trapping capability and thus high brightness (transparent) for displays and lighting.
4. Easy to be scaled up for preparation on large-area substrates in a manufacturing sense.
5. Lower cost as compared to the state-of-art screen scattering techniques.
6. Function as well as UV-opaque layers.
7. Can be applied in rear projection screens
8. Can be applied in LCD and LED monitors/displays
9. Can produce large-area and uniform LED illumination It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose. The following references are referred to in the aforementioned description, contents of which are incorporated herein in their entirety.

1. Zhenzhen Lu, Jun Xu, Xing Xie, Hongkang Wang, Chundong Wang, So-Ying Kwok, Tailun Wong, Hoi Lun Kwong, Igor Bello, Chun-Sing Lee, Shuit-Tong Lee, and Wenjun Zhang, J. Phys. Chem. C 2012, 116, 2656
2. H. S. Song, W. J. Zhang, C. Cheng, Y. B. Tang, L. B. Luo, N. Wang, C. S. Lee, I. Bello, and S. T, Lee, Cryst, Growth Des. 2011, 11(1), 147,
3. A. M. Nuijs, et al, Applied Optics, Vol. 33, No. 18, Jun. 20, 1994.
4. T. W. Lin, C. F. Chen, J. J. Yang and Y. S. Liao, Nanotechnol., 2008, 18, 095029.
5. C. Mastuda, www.techon.nikkeibp.co.jp/english/NEWS_EN/20090306/166841/, May 3, 2009, Tech-On.
6. Naoki HiJi, Kakznuma, Chikara Manabe, Tadayoshi, Screen Device, Image Projection system, and Image Projection method, US patent, 2010/0208217 A1, published on 2 Sep. 2009.

The invention claimed is:

1. A screen scattering system, comprising
   a) a transparent substrate forming a substrate layer;
   b) wide band gap materials made of 0D, 1D and 3D elements forming a scattering layer;
   wherein said 0D, 1D and 3D elements are in the form of nanostructures aligned uniformly on said substrate layer.

2. A system as claimed in claim 1, wherein said wide band gap materials are arranged in the form of nano-structure array.

3. A system as claimed in claim 2, wherein said wide band gap materials are selected from ZnO, $TiO_2$, $SnO_2$, GaN, and wherein the value of band gap of said materials is >3.0 eV.

4. A system as claimed in claim 2, wherein said nanostructure array includes 0D high density elements, 1D elements, and 3D hierarchical elements.

5. A system as claimed in claim 4, wherein said 0D elements include 1D nano-sphere, said 1D elements include nanowires, nano-ribbons and nano-rods, and said 3D hierarchical elements include nano-trees and nanostructure arrays.

6. A system as claimed in claim 1, wherein said substrate layer is configured for deposition of said wide band gap materials, and said wide band gap materials are inorganic materials selected from a group including glass, quartz, and sapphire.

7. A system as claimed in claim 1, wherein said substrate layer is configured for deposition of said wide band gap materials, and said wide band gap materials are flexible organic materials selected from a group including perspex, pyrex and polymethylmethacrylate.

8. A system as claimed in claim 1, wherein said system is a display system such as rear projection screen system, LCD system or a LED system.

9. A system as claimed in claim 1, wherein said system is a display device.

10. A system as claimed in claim 9, wherein said display device is a LED lamp or a LCD lamp.

11. A method of making a screen scattering system as claimed in claim 1, comprising a step of forming a seeding layer made of the same or different material from that of a scattering layer.

12. A method as claimed in claim 11, wherein the value of the wide band gap materials is at least 3.0 eV.

13. A method as claimed in claim 11, comprising the use of methodology selected from the group consisting of:
   a) chemical bath deposition (CBD);
   b) hydrothermal;
   c) chemical vapor deposition (CVD) via VLS and VS mechanisms with or without the assistance of metal catalyst, magnetron sputtering; and
   d) metal organic chemical vapor deposition (MOCVD).

14. A method as claimed in claim 13, wherein the seeding layer is formed by deposition prior to synthesis of the scattering layer.

15. A method as claimed in claim 11, wherein the seeding layer is deposited by means of chemical bath deposition (CBD), hydrothermal, chemical vapor deposition (CVD), magnetron sputtering, or laser ablation.

* * * * *